United States Patent
Arpac et al.

(10) Patent No.: US 7,901,657 B2
(45) Date of Patent: Mar. 8, 2011

(54) AMPHIPHILIC NANOPARTICLES

(75) Inventors: Ertugrul Arpac, Antalya (TR); Helmut Schmidt, Saarbruecken-Guedingen (DE); Murat Akarsu, Saarbruecken (DE)

(73) Assignee: Leibniz-Institut Fuer Neue Materialien Gemeinnuetzige GmbH, Saarbruecken (DE)

( * ) Notice: Subject to any disclaimer, the term of this patent is extended or adjusted under 35 U.S.C. 154(b) by 934 days.

(21) Appl. No.: 10/589,985

(22) PCT Filed: Feb. 25, 2005

(86) PCT No.: PCT/EP2005/002023
§ 371 (c)(1),
(2), (4) Date: Dec. 7, 2006

(87) PCT Pub. No.: WO2005/082514
PCT Pub. Date: Sep. 9, 2005

(65) Prior Publication Data
US 2008/0134939 A1    Jun. 12, 2008

(30) Foreign Application Priority Data
Feb. 26, 2004    (DE) .......................... 10 2004 009 287

(51) Int. Cl.
*C04B 38/00*    (2006.01)
(52) U.S. Cl. ...................... 423/592.1; 423/263; 423/277; 423/335; 423/594.18; 423/594.17; 423/594.1; 423/598; 423/594.9; 423/594.7; 423/604; 423/606; 423/608; 423/610; 423/618; 423/622; 423/625; 423/624; 423/630; 423/632; 423/636; 977/773; 977/775; 501/12
(58) Field of Classification Search .................. 977/773, 977/775; 423/592.1, 263, 277, 335, 604–636, 423/594.1, 594.18, 594.17, 594.9, 598, 600; 501/12
See application file for complete search history.

(56) References Cited

U.S. PATENT DOCUMENTS

| | | | |
|---|---|---|---|
| 4,895,767 A | 1/1990 | Mori et al. | |
| 5,593,781 A | 1/1997 | Nass et al. | |
| 5,644,014 A | 7/1997 | Schmidt et al. | |
| 5,910,522 A | 6/1999 | Schmidt et al. | |
| 6,008,285 A | 12/1999 | Kasemann et al. | |
| 6,228,921 B1 | 5/2001 | Kasemann et al. | |
| 6,291,070 B1 | 9/2001 | Arpac et al. | |
| 6,583,191 B2 * | 6/2003 | Markowitz et al. | 521/99 |
| 6,620,514 B1 | 9/2003 | Arpac et al. | |
| 2002/0004544 A1 | 1/2002 | Kolb et al. | |
| 2002/0164481 A1 * | 11/2002 | Garcia et al. | 428/402 |
| 2002/0193504 A1 * | 12/2002 | Brueck et al. | 524/588 |
| 2005/0130827 A1 * | 6/2005 | Schunk et al. | 501/80 |
| 2005/0191505 A1 | 9/2005 | Akarsu et al. | |

FOREIGN PATENT DOCUMENTS

| | | |
|---|---|---|
| DE | 4338361 | 5/1995 |
| EP | 0195493 | 9/1986 |
| WO | 92/21729 | 12/1992 |
| WO | 93/21127 | 10/1993 |
| WO | 96/31572 | 10/1996 |
| WO | 01/30702 | 5/2001 |
| WO | 03-070662 | * 8/2003 |

OTHER PUBLICATIONS

J. Livage et al., "Sol-Gel Chemistry of Transition Metal Oxides", Prog. Solid. St. Chem., vol. 18, 1988, pp. 259-341.
M. Wong et al., "Amphiphillic Templating of Mesostructured Zirconium Oxide", Chem. Mater., vol. 10, 1998, pp. 2067-2077.
U.S. Appl. No. 10/589,986 (Arpac et al.), filed Aug. 18, 2006.

* cited by examiner

Primary Examiner — Steven Bos
(74) Attorney, Agent, or Firm — Greenblum & Bernstein, P.L.C.

(57) ABSTRACT

The invention relates to amphiphilic, nanoscalar particles comprising lipophilic hydrolyzable groups on their surface. The invention also relates to methods for producing amphiphilic, nanoscalar particles and to compositions containing said particles.

31 Claims, No Drawings

AMPHIPHILIC NANOPARTICLES

CROSS-REFERENCE TO RELATED APPLICATIONS

The present application is a U.S. National Stage of International Application No. PCT/EP2005/002023, filed Feb. 25, 2005, which claims priority of German Patent Application No. 10 2004 009 287.7, filed Feb. 26, 2004.

BACKGROUND OF THE INVENTION

1. Field of the Invention

The present invention relates to amphiphilic nanoscale particles, to processes for their production and to their use.

2. Discussion of Background Information

The production of nanoscale particles usable in industrial processes has long been an interesting objective. When nanoparticles are produced by means of sol-gel or other precipitation techniques, agglomeration can be prevented by applying a surface charge (double-charge cloud). The repulsive forces can be adjusted via the size of the surface charge ($\zeta$ potential), so that they prevent coagulation of the particles. The $\zeta$ potential can generally be adjusted by the suitable selection of the pH. These connections were identified by Stem as early as the start of the 20th century. The colloid stability achieved as a result leads to the ability to keep nanoparticulate suspensions, also known as sols, stable over prolonged periods.

Another form of stabilization is that of the additional use of functional groups which can likewise bear charges and can be employed to form stable systems via the $\zeta$ potential. This is referred to as electrosteric stabilization. The charge-stabilized nanosuspensions or sols can thus be destabilized at the so-called isoelectric point, i.e. a pH is selected at which the surface charge is zero. Aggregates or else gels are then formed if the aggregates combine to larger units.

In addition to these stabilization forms by means of the application of charges, there is yet a further form in which the surface of the nanoparticles is provided with groups which are very similar to the surrounding liquid. This can be achieved, for example, with $SiO_2$ particles whose surface is covered fully with OH groups. The result of this is that, even at the isoelectric point, silicas, for example in aqueous systems, do not precipitate out because the free interface enthalpy between the surface and the surrounding liquid itself is already at a minimum and no enthalpy gain occurs by aggregation. Such stabilizations are typical mainly for aqueous silica sols (SiOH groups).

The avoidance of agglomerates or aggregates is of crucial significance for the further industrial processing of the nanoparticles. This applies both to the production of shaped bodies from such particles and to their dispersion in a matrix material. The interesting properties of nanoparticles, for example interface effects or transparency, can only come into full effect when they are homogeneously dispersible.

While, in the case of electrostatic stabilization (without additional groups), especially in the case of oxidic but also in the case of nonoxidic systems, strong interaction via the formation of chemical bonds (for example SiOSi bonds, significantly stronger in the case of TiOTi or ZrOZr) occurs in the case of formation of aggregates, which enables redispersibility, for example, only with use of strong acids usually undesired in process technology, it is possible in the case of surface modifications with functional groups which do not react chemically with one another for aggregates to occur under certain conditions, which, however, can be returned back to the starting particles in an easily reversible manner with changed conditions.

This principle of chemical surface modification is described in the literature and is frequently used to increase redispersibility. Such surface modification has been described, for example, by the applicant, for example in WO 93/21127 (DE 4212633) or WO 96/31572. However, the disadvantage of this surface modification is that a complicated chemical step is needed for this purpose, in which the surface-modifying molecule has to be converted to a stable bond with groups on the surface of the particles.

According to the prior art, such a surface modification requires heating, for example heating under reflux, and/or the action of shear forces, for example by means of kneaders or mills. An additional factor is that this surface modification virtually has to be tailored to the particular dispersion medium. For example, hydrophilically surface-modified nanoparticles can be dispersed in aqueous or water-like solvents but not in nonpolar solvents, and vice versa.

The object of the present invention was thus directed to the development of nanoparticles for which such surface modification is not required, but which, without further process steps, can be dispersed either in organic solvents or in aqueous solvents. The invention shall additionally solve the problem of significantly reducing the costs for the production of nanoparticles, by virtue firstly of the surface modification as such being unnecessary, and also adjustment and dependency of the dispersion medium required in each case by different surface modifiers no longer being required.

SUMMARY OF THE INVENTION

The present invention provides a process for the production of an amphiphilic nanoscale particle which comprises a hydrolyzable lipophilic radical on the surface thereof. The process comprises (a) subjecting at least one hydrolysable compound which comprises at least one hydrolysable lipophilic group to a hydrolysis and condensation reaction with a substoichiometric amount of water and (b) the subsequent removal of liquid to obtain a plurality of the resultant amphiphilic nanoscale particle in the form of a powder.

In one aspect of the process, the at least one hydrolysable compound may comprise (i) a hydrolysable metal or semimetal compound which comprises at least one hydrolysable lipophilic group and may comprise one or more non-hydrolysable groups and/or (ii) a condensation product derived from the at least one hydrolysable compound.

In another aspect of the process, the at least one hydrolysable compound may comprises an alkoxide.

In yet another aspect, the at least one hydrolysable compound may comprise (i) a compound of at least one of Mg, Si, Ge, Al, B, Zn, Cd, Ti, Zr, Ce, Sn, In, La, Fe, Cu, Ta, Nb, V, Mo or W and/or (ii) a condensation product derived therefrom.

In a still further aspect of the process, the at least one hydrolysable lipophilic group may comprise at least four carbon atoms, e.g., at least five carbon atoms.

In another aspect, the process may further comprise the reaction of the amphiphilic nanoscale particle with a surface modifier to provide the particle with one or more functional groups on the surface thereof. This reaction may be carried out in a solvent. The surface modifier may, for example, comprise one or more of a saturated or unsaturated carboxylic acid, a β-dicarbonyl compound, an amine, a phosphonic acid, a sulfonic acid and a silane.

In another aspect, in addition to at least one functional group for attachment or complexation to the surface of the particle, the surface modifier may comprise at least one further functional group.

In yet another aspect, the surface modifier may comprise a complexing agent.

The present invention also provides an amphiphilic nanoscale particle. This particle comprises at least one hydrolysable lipophilic radical on the surface thereof.

In one aspect, the at least one hydrolysable radical may comprise a lipophilic moiety which has at least four carbon atoms, e.g., at least five carbon atoms.

In another aspect of the particle, the at least one hydrolysable radical may comprise at least one of an alkoxy, alkenyloxy, alkynyloxy, aryloxy, aralkyloxy, alkaryloxy, ether, acyloxy, alkyl or acyl radical. For example, the at least one hydrolysable radical may comprise a $C_4$-$C_{20}$-alkoxy radical such as, e.g., a pentoxy radical and/or a hexoxy radical. Further, the at least one hydrolysable radical may be fluorinated.

In yet another aspect of the particle, the at least one hydrolysable radical may be derived from a hydrolysable precursor of the particle.

In a still further aspect, the particle may comprise one or more oxides, optionally hydrated, of one or more metals or semimetals. In another aspect, the particle may comprise at least one compound of one or more elements selected from Mg, Si, Ge, Al, B, Zn, Cd, Ti, Zr, Ce, Sn, In, La, Fe, Cu, Ta, Nb, V, Mo and W.

In another aspect, the particle may be surface-modified with at least one function group. The at least one function group may comprise at least one functional group. Further, the at least one functional group may be capable of entering into a crosslinking reaction with a functional group of the same type or a different type. For example, the at least one functional group may comprise at least one of a hydroxy, epoxy, thiol, amino, carboxyl, carboxylic anhydride, carbonyl, isocyanate, sulfonic acid, phosphonic acid and quaternary amine group, a C—C double bond and a fluorinated hydrocarbon group.

In yet another aspect, the particle may be doped.

In another aspect, the particle may comprise a coating of a material which is different from the material of the particle to form a core/shell system.

The present invention also provides a powder which comprises a plurality of the particle of the present invention as set forth above, including the various aspects thereof.

The present invention further provides a composition which comprises the particle of the present invention as set forth above, including the various aspects thereof, and a matrix forming material. For example, the particle may be surface-modified with a functional group which is capable of entering into a crosslinking reaction with a functional group of the matrix forming material.

In one aspect, the composition may be a coating composition, an adhesive, a resin composition, a sealant, a paste, a molding composition and/or a slip.

DETAILED DESCRIPTION OF THE INVENTION

Surprisingly, the object of the present invention can be achieved by providing amphiphilic nanoscale particles which, on the surface, have hydrolyzable radicals which are lipophilic. The hydrolyzable radicals stem in particular from the hydrolyzable precursors of the particles. The invention further relates to a process for producing amphiphilic nanoscale particles which have, on the surface, hydrolyzable radicals which are lipophilic, said process comprising a) the hydrolysis and condensation of one or more hydrolyzable compounds which include at least one lipophilic hydrolyzable group with a substoichiometric amount of water and b) the removal of solvent in order to obtain the resulting amphiphilic particles with hydrolyzable radicals as powder.

The hydrolyzable compounds are understood to mean the hydrolyzable monomers or condensation products thereof. The hydrolyzable compounds are also referred to as hydrolyzable precursors of the particles. For the production, in the case of hydrolyzable compounds as precursors of the particles, for example alkoxides, a nucleation and growth process can be set in motion with a relatively small amount of hydrolysis agent (for example water, aqueous acids or aqueous bases) and leads either to crystalline or amorphous inorganic solid-state nanoparticles whose surface is still covered with unhydrolyzed precursors. In the context of the present invention, it is particularly astonishing that the particles can be concentrated by evaporation to dryness without losing their amphiphilicity.

The particles according to the present invention can surprisingly be dispersed directly both in aqueous and in organic media, without requiring additional surface modification. The amphiphilic particles according to the invention can, for example, astonishingly be dispersed directly without further treatment both in water and in toluene. When the amphiphilic particles are dispersed with nonpolar solvents, it should be ensured that the solvent is essentially anhydrous in order to avoid hydrolysis of the hydrolyzable groups.

As shown in the examples below, the same inventive amphiphilic particle can be dispersed directly in such different solvents as water, methanol, toluene and hexane, and the particles, provided that no hydrolysis proceeds, can be freed from the dispersion medium and then redispersed again in the same or another solvent, i.e. the particles are reversibly dispersible in anhydrous solvent media.

Without wishing to be bound to a theory, it is suspected that this surprising effect can be explained by the lipophilic hydrolyzable radicals present on the particle surface being highly compatible with nonpolar organic solvents and agglomeration thus being prevented. The easy dispersibility in water can be explained, for example, by the hydrolyzable lipophilic radicals being hydrolyzed in the water, such that only hydrophilic groups which are readily compatible with the polar dispersion medium remain on the surface.

Such amphiphilic particle systems can, for example, be freed of solvents and the resulting powder can be redispersed again at any time. When additional functions are required, it is also possible to carry out appropriate surface modifications, dopings or other adjustments, as described below.

The invention therefore provides nanoscale particles which, on the surface, have hydrolyzable radicals which are lipophilic. The expressions nanoscale particles and nanoparticles are used here synonymously.

The term "amphiphilic" is a familiar term in the field of chemistry. Amphiphilicity here describes the property of the particles of being dispersible both in water as a polar or hydrophilic solvent and in nonpolar or lipophilic solvents such as toluene or hexane. This compatibility results, with regard to the nonpolar media, from the lipophilic groups present on the surface of the particles, and, with regard to water, from the hydrolyzability of the lipophilic groups present which are hydrolyzed in water to leave hydrophilic groups such as hydroxyl groups on the surface of the particles. In addition to the hydrophilic groups formed by the hydrolysis, the particles may also already have hydrophilic groups on the surface before the hydrolysis.

The concept of hydrophilicity/lipophilicity is very familiar to the person skilled in the art. Lipophilic and hydrophobic groups have the tendency not to penetrate into water and to remain therein, while hydrophilic groups have the tendency to penetrate into water and to remain therein.

Lipophilic compounds or groups have the tendency to disperse or to dissolve in a nonpolar medium, for example an organic solvent, for example hexane or toluene, while hydrophilic compounds or groups have the tendency to disperse or to dissolve in a polar medium, for example water. The hydrophilic character can arise, for example, as a result of hydroxyl, oxy, oxide, carboxylate, sulfate, sulfonate functions, generally ionic groups or hydrophilic polyether chains, while lipophilic character is present, for example, typically in the case of hydrocarbon radicals such as alkyl radicals or aromatic radicals.

In the amphiphilic particles according to the present invention, the hydrolyzable radicals are lipophilic, i.e. they include a lipophilic moiety which has an affinity for nonpolar media. For example, in the case of a hydrolyzable alkoxy group on the surface of a particle, the lipophilic character arises by virtue of the lipophilic alkyl group of the alkoxy group. These hydrolyzable radicals can, as a whole, be referred to as lipophilic groups. The hydrophilic groups formed by the hydrolysis and/or already present are, for example, hydroxyl, oxy or oxide groups on the surface of the particles, for example in the case of oxidic particles.

The amphiphilic particles according to the invention are nanoscale particles, i.e. the particle size is less than 1 μm. Unless stated otherwise, particle size is understood here to mean the mean volume-average particle diameter, for which a UPA (Ultrafine Particle Analyzer, Leeds Northrup (laser optics, dynamic laser light scattering)) can be used for the measurement. The mean particle diameter is preferably not more than 200 nm, more preferably not more than 100 nm, for example from 1 to 200 nm, preferably from 2 to 100 nm, for example from 2 to 50 nm. To determine very small particles in this range, it is also possible to use electron microscopy methods (for example by means of HR-TEM). They may optionally also be fibrous particles. In this case, the mean particle size relates to the length which can, for example, also be determined visually with microscopic methods.

The nanoscale particles are in particular nanoscale inorganic solid particles. The nanoparticles are preferably of metal, including metal alloys, metal or semimetal compounds, especially metal chalcogenides. For this purpose, all metals or semimetals (hereinafter also abbreviated together as M) may be used. Preferred metals or semimetals M for the metal or semimetal compounds are, for example, Mg, B, Al, Ga, In, Si, Ge, Sn, Pb, Y, Ti, Zr, V, Nb, Ta, Mo, W, Fe, Cu, Ag, Zn, Cd, Ce and La, or mixtures thereof. It is possible to use one type of nanoparticles or a mixture of nanoparticles.

The nanoparticles may preferably be composed of metal or semimetal compounds. Examples are (optionally hydrated) oxides such as ZnO, CdO, $SiO_2$, $GeO_2$, $TiO_2$, $ZrO_2$, $CeO_2$, $SnO_2$, $Al_2O_3$ (especially boehmite, AlO(OH) also as aluminum hydroxide), $B_2O_3$, $In_2O_3$, $La_2O_3$, $Fe_2O_3$, $Fe_3O_4$, $Cu_2O$, $Ta_2O_5$, $Nb_2O_5$, $V_2O_5$, $MoO_3$ or $WO_3$; phosphates, silicates, zirconates, aluminates, stannates of metals or semimetals, and corresponding mixed oxides (e.g. indium tin oxide (ITO), antimony tin oxide (ATO), fluorine-doped tin oxide (FTO), luminescent pigments with Y or Eu compounds, spinels, ferrites or mixed oxides with perovskite structure, such as $BaTiO_3$ and $PbTiO_3$).

The nanoparticles are preferably an oxide, the oxide optionally being hydrated (oxide hydrate), especially of Mg, Si, Ge, Al, B, Zn, Cd, Ti, Zr, Ce, Sn, In, La, Fe, Cu, Ta, Nb, V, Mo or W, more preferably of Si, Al, B, Sn, Ti, Zr, Mg, V and Zn. Preferred nanoscale particles are $SiO_2$, $Al_2O_3$, AlOOH, $Ta_2O_5$, $ZrO_2$ and $TiO_2$, $ZrO_2$ being the most preferred.

Nanoscale particles can conventionally be produced in various ways, for example by flame pyrolysis, plasma methods, colloid techniques, sol-gel processes, controlled seeding and growth processes, MOCVD methods and emulsion methods. These processes are described comprehensively in the literature.

The amphiphilic nanoscale particles according to the invention are preferably produced by a sol-gel process to form the nanoscale particles. In the sol-gel process, hydrolyzable compounds are commonly hydrolyzed with water, optionally under acidic or basic catalysis, and optionally at least partly condensed. The hydrolysis and/or condensation reactions lead to the formation of compounds or condensates with hydroxyl, oxo groups and/or oxo bridges, which serve as precursors. Suitable adjustment of the parameters, for example degree of condensation, solvent, temperature, water concentration, duration or pH, allows the amphiphilic sol comprising nanoscale particles to be obtained. Further details of the sol-gel process are described, for example, in C. J. Brinker, G. W. Scherer: "Sol-Gel Science—The Physics and Chemistry of Sol-Gel-Processing", Academic Press, Boston, San Diego, New York, Sydney (1990).

According to the invention, the hydrolysis and condensation reaction is carried out such that the hydrolyzable compounds are incompletely hydrolyzed and nanoparticles are formed, i.e. the nanoscale particles formed still have hydrolyzable groups on the surface. The person skilled in the art faced with the task of incomplete hydrolyzing the hydrolyzable compounds is familiar with how this is achieved by suitable adjustment of the abovementioned parameters. Some preferred conditions are explained below.

The hydrolysis and condensation can be carried out in a solvent, but they can also be carried out without solvent, in which case solvents or other liquid constituents can be formed in the hydrolysis, for example in the hydrolysis of alkoxides. The removal of the solvent can include the removal of liquid constituents present. The removal of the solvent can be effected, for example, by filtration, centrifuge removal and/or drying, for example evaporation.

Preference is given to effecting the hydrolysis with a substoichiometric amount of water, i.e. the molar ratio of water to hydrolyzable groups of the hydrolyzable compounds is less than 1, preferably not more than 0.8, more preferably not more than 0.6 and even more preferably not more than 0.5, in particular less than 0.5. The molar ratio is preferably greater than 0.1 and more preferably greater than 0.2. A preferred molar ratio is, for example, from 0.25 to 0.5, the best results being obtained in preferred embodiments with a molar ratio of about 0.45.

As stated, the hydrolysis can be acid- or base-catalyzed, preference being given to acid catalysis. The hydrolysis can be carried out at room temperature (about 23° C.), but is preferably effected with heating, for example to at least 40° C., preferably at least 100° C. or at least 200° C. In a further preferred embodiment, the hydrolysis is effected with heating and pressure (hydrothermal reaction), for example by heating in a closed vessel. By their nature, suitable reaction conditions depend on the starting compounds used, so that, for example, a wide range of suitable conditions may be appropriate depending on the stability of the starting compound. The person skilled in the art can select suitable conditions immediately depending on the compounds selected.

The hydrolyzable compounds or precursors employed may be alkoxides, but also other compounds which are capable of hydrolysis, for example acyl-containing precursors or complexed precursors, for example β-diketone complexes. It is also possible to employ organyls with metal-carbon bonds. Useful metal or semimetal compounds are in principle all metals or semimetals of the main and transition groups from which alkoxides or other hydrolyzable compounds can be prepared. The semimetals used in addition to the pure metals are, for example, Si, B or Ge. The hydrolyzable compounds useable for this purpose are illustrated further below.

Suitable hydrolyzable compounds are in principle hydrolyzable metal or semimetal compounds, for example of the metals and semimetals M which have been listed above and, in addition to hydrolyzable groups, may optionally also have non-hydrolyzable groups. It is possible to use one or more hydrolyzable compounds.

It should be noted at this point that, as known to the person skilled in the art, the hydrolyzability of the group of course also depends upon the central atom M to which the group is bonded, so that a certain group may be hydrolyzable or non-hydrolyzable, depending on which M it is bonded to. These connections are known to those skilled in the art. For example, an alkyl group which is bonded to Si is not hydrolyzable, while the alkyl group on another central atom, for example zirconium, may be hydrolyzable. In the case of the latter central atoms, lipophilic alkyl radicals are then also conceivable as hydrolyzable groups.

In addition, for example, in the case of some metals, for example in the case of bis(acetylacetonate)zinc, zinc acetate or calcium acetate, carboxylate or acetylacetonate groups are hydrolyzable, while these groups are no longer hydrolyzable in the case of larger metals, for example Ti, Zr or Fe.

The lipophilic hydrolyzable groups which are present on the surface of the inventive particles include a lipophilic radical, the lipophilic radical having in particular at least 4 and preferably at least 5 carbon atoms. Specific lipophilic hydrolyzable groups are lipophilic alkoxy, alkenyloxy, alkynyloxy, aryloxy, aralkyloxy, alkaryloxy, acyloxy, ether such as alkoxyalkoxy or alkoxyalkoxyalkoxy, and acyl radicals, particular preference being given to alkoxy radicals. The lipophilic radicals mentioned also include corresponding cyclic radicals, for example cycloalkyloxy radicals. As stated, the hydrolyzability of the group also depends upon the central atom to which it is bonded.

The lipophilic radicals preferably have a saturated, unsaturated or aromatic, branched or unbranched hydrocarbon radical having at least 4 and preferably at least 5 carbon atoms.

Examples or preferred alkoxy groups are $C_4$-$C_{20}$-alkoxy, preferably $C_4$-$C_{10}$-alkoxy, such as n-butoxy, isobutoxy, sec-butoxy, tert-butoxy, linear or branched pentoxy, hexoxy, heptoxy or octoxy such as 2-ethylhexoxy, cyclohexyloxy. The alkoxy group may be branched or preferably linear; an advantageous branched alkoxy group is, for example, 2-ethylhexoxy. Examples of alkenyloxy groups are $C_4$-$C_{20}$-alkenyloxy, preferably $C_4$-$C_{10}$-alkenyloxy, such as butenoxy, pentenoxy, hexenoxy, heptenoxy, octenoxy and higher alkenoxy groups, preference being given to pentenyl and hexenyl, for example $CH_3CH_2CH=CHCH_2CH_2O$— or $CH_2=CH(CH_2)_4O$—. The alkenyloxy group may be branched or preferably linear; the double bond may be at any position. It is also possible for more than one double bond to be present. Examples of alkynyloxy groups are $C_4$-$C_{20}$-alkynyloxy, preferably $C_4$-$C_{10}$-alkynyloxy, such as pentynyloxy or hexynyloxy.

The lipophilic aryloxy, aralkyloxy and alkaryloxy groups may, for example, have from 6 to 20, preferably from 6 to 15 carbon atoms. Examples are phenyloxy, naphthyloxy, tolyloxy and benzyloxy. Suitable lipophilic hydrolyzable ether groups have, for example, the general formula $R^1(—OR^2)_xO—$, where $R^1$ is a lipophilic alkyl group, $R^2$ is an alkylene group, for example having from 1 to 4 carbon atoms, such as ethylene or propylene, and x is an integer from 1 to 4, preferably 1 or 2. The $R^1$ group is preferably a $C_4$-$C_{20}$-alkyl group, such as butyl, pentyl, hexyl, cyclohexyl, heptyl or octyl. Specific examples are butoxyethoxy and hexoxyethoxy.

Examples of acyl groups are $C_4$-$C_{20}$-acyl, preferably $C_4$-$C_{10}$-acyl, such as butyryl, valeroyl and caproyl ($C_6$-acyl). Examples of acyloxy groups, when hydrolyzable, are $C_4$-$C_{20}$-acyloxy, preferably $C_4$-$C_{10}$-acyloxy, such as butyryloxy, valeroyloxy and caproyloxy. Alkyl groups, when they are hydrolyzable, have, for example, from 4 to 20, preferably from 4 to 10 carbon atoms. Examples are the $R^1$ groups mentioned above for the ethers. In this case, it is also possible to use fluorinated $C_4$-$C_{20}$-alkyl groups as hydrolyzable lipophilic groups, for example $C_2F_5$—$CH_2CH_2$, n-$C_6F_{13}$—$CH_2CH_2$, n-$C_8F_{17}$—$CH_2CH_2$, n-$C_{10}F_{21}$—$CH_2CH_2$, iso-$C_3F_7O$—$CH_2CH_2CH_2$, n-$C_6F_{13}$—$CH_2CH_2$ and n-$C_6F_{13}$—$CH_2CH_2$. Optionally, it is also possible for other hydrolyzable radicals to be substituted by fluorine at least one carbon atom. When the lipophilic group is such a fluorinated hydrocarbon chain, it may also comprise less than 4 carbon atoms, for example at least 1 and preferably at least 2 carbon atoms.

The hydrolyzable metal or semimetal compounds may be compounds of the general formula $MX_n$ (I) where M is the above-defined metal or semimetal, X is a hydrolyzable group which may be the same or different, where two X groups may be replaced by one bidentate hydrolyzable group or one oxo group, or three X groups may be replaced by a tridentate hydrolyzable group, and n corresponds to the valency of the element and is frequently 3 or 4.

In the compound of the formula (I), at least one hydrolyzable X group is lipophilic. Preferably, all X groups of the formula (I) are lipophilic. Examples of hydrophilic lipophilic groups have been mentioned above. Further examples of hydrolyzable X groups are, for example, halogen (F, Cl, Br or I, in particular Cl and Br), $C_{1-3}$-alkoxy, for example ethoxy, n-propoxy, iso-propoxy, $C_{1-3}$-acyloxy, for example acetoxy or propionyloxy, $C_1$-$C_3$-alkenyloxy such as vinyl- or allyloxy, $C_1$-$C_3$-alkynyloxy, or $C_{2-3}$-alkylcarbonyl, for example acetyl.

Examples of hydrolyzable compounds with preferred lipophilic groups are, for example, Al(O-n-$C_4H_9$)$_3$, Al(O-sec-$C_4H_9$)$_3$, Al(OC$_2$H$_4$OC$_4$H$_9$)$_3$, Ti(OC$_4$H$_9$)$_4$, Ti(pentoxy)$_4$, Ti(hexoxy)$_4$, Ti(2-ethylhexoxy)$_4$, Zr(OC$_4$H$_9$)$_4$, Zr(pentoxy)$_4$, Zr(hexoxy)$_4$, Zr(2-ethylhexoxy)$_4$, and also Zr compounds which have complexing radicals, for example β-diketone and (meth)acryloyl radicals, Si(OC$_4$H$_9$)$_4$, where the pentoxy and hexoxy radicals mentioned may be linear or branched.

Examples of further hydrolyzable compounds are Al(OCH$_3$)$_3$, Al(OC$_2$H$_5$)$_3$, Al(O-n-C$_3$H$_7$)$_3$, Al(O-i-C$_3$H$_7$)$_3$, AlCl$_3$, AlCl(OH)$_2$, Ti(OCH$_3$)$_4$, Ti(OC$_2$H$_5$)$_4$, TiCl$_4$, Ti(OC$_2$H$_5$)$_4$, Ti(O-n-C$_3$H$_7$)$_4$, Ti(O-i-C$_3$H$_7$)$_4$, ZrCl$_4$, Zr(OC$_2$H$_5$)$_4$, Zr(O-n-C$_3$H$_7$)$_4$, Zr(O-i-C$_3$H$_7$)$_4$, ZrOCl$_2$, boric acid, BCl$_3$, B(OCH$_3$)$_3$, B(OC$_2$H$_5$)$_3$, SnCl$_4$, Sn(OCH$_3$)$_4$, Sn(OC$_2$H$_5$)$_4$, Si(OOCCH$_3$)$_4$, VOCl$_3$ and VO(OCH$_3$)$_3$, Si(OCH$_3$)$_4$, Si(OC$_2$H$_5$)$_4$, Si(O-n- or i-C$_3$H$_7$)$_4$, SiCl$_4$ and HSiCl$_3$.

Compounds with aforementioned hydrolyzable groups which are not lipophilic may be used as starting compounds to prepare compounds with lipophilic hydrolyzable groups.

The hydrolyzable compounds with the lipophilic hydrolyzable groups mentioned may be commercially available. They may also be prepared from other hydrolyzable compounds, for example by exchange reactions. This may, for example, be appropriate when other hydrolyzable compounds are more easily obtainable. For example, a metal alkoxide or semimetal alkoxide, such as a metal ethoxide or metal propoxide, may be reacted with a higher alcohol, for example pentanol, hexanol or 2-ethylhexanol, in order to replace the alkoxy group of the alkoxide with the alkoxy group of the higher alcohol. The exchange reaction can be carried out fully or only partly.

Such an exchange reaction may also be used in order to form the desired compounds with hydrolyzable lipophilic groups in situ from other hydrolyzable compounds and to convert them to the desired amphiphilic particles directly without isolation.

The hydrolyzable metal or semimetal compounds, for example those of the above formula (I), may also have complexing radicals, for example β-diketone and (meth)acryloyl radicals. Especially in the case of the relatively reactive alkoxides (for example Al, Ti, Zr, etc.), it may be advisable under some circumstances to use them in complexed form, examples of suitable complexing agents being unsaturated carboxylic acids and β-dicarbonyl compounds, for example methacrylic acid, acetylacetone and ethyl acetoacetate.

It is also possible to use hydrolyzable compounds which contain at least one non-hydrolyzable group. Examples are silanes of the general formula $R_aSiX_{(4-a)}$ (II) where the R radicals are the same or different and are each non-hydrolyzable groups, the X radicals are the same or different and are each hydrolyzable groups or hydroxyl groups, and a is 1, 2 or 3, or an oligomer derived therefrom. a is preferably 1 or 2.

In the general formula (II), the hydrolyzable X groups, which may be the same or different, are, for example, hydrogen or halogen (F, Cl, Br or I), alkoxy (preferably $C_{1-6}$-alkoxy, for example methoxy, ethoxy, n-propoxy, isopropoxy and butoxy), aryloxy (preferably $C_{6-10}$-aryloxy, for example phenoxy), acyloxy (preferably $C_{1-6}$-acyloxy, for example acetoxy or propionyloxy), alkylcarbonyl (preferably $C_{2-7}$-alkylcarbonyl, for example acetyl), amino, monoalkylamino or dialkylamino having preferably from 1 to 12, in particular from 1 to 6 carbon atoms. Preferred hydrolyzable radicals are halogen, alkoxy groups (especially ethoxy and methoxy) and acyloxy groups. When hydrolyzable lipophilic groups are to be introduced into the nanoparticles with a silane of the formula (II), X may be one of the hydrolyzable lipophilic groups described above, for example for the compounds of the formula (I).

The non-hydrolyzable R radicals which may be the same or different may be non-hydrolyzable R radicals with a functional group or be non-hydrolyzable R radicals without such a functional group.

The non-hydrolyzable R radical without a functional group is, for example, alkyl (preferably $C_{1-8}$-alkyl such as methyl, ethyl, n-propyl, isopropyl, n-butyl, s-butyl and t-butyl, pentyl, hexyl, octyl or cyclohexyl), aryl (preferably $C_{6-10}$-aryl, for example phenyl and naphthyl), and also corresponding alkylaryls and arylalkyls. The R and X radicals may optionally have one or more customary substituents, for example halogen or alkoxy.

The non-hydrolyzable R radical with a functional group may include, for example, as the functional group, an epoxy (e.g. glycidyl or glycidyloxy), hydroxyl, ether, amino, monoalkylamino, dialkylamino, optionally substituted anilino, amide, carboxyl, alkenyl, alkynyl, acryloyl, acryloyloxy, methacryloyl, methacryloyloxy, mercapto, cyano, alkoxy, isocyanato, aldehyde, alkylcarbonyl, acid anhydride and phosphoric acid group. These functional groups are bonded to the silicon atom via alkylene, alkenylene or arylene bridging groups which may be interrupted by oxygen or —NH— groups. The bridging groups contain preferably from 1 to 18, preferably from 1 to 8 and in particular from 1 to 6 carbon atoms. Examples of non-hydrolyzable R radicals with an alkenyl or alkynyl group are $C_{2-6}$-alkenyl, for example vinyl, 1-propenyl, 2-propenyl and butenyl, and $C_{2-6}$-alkynyl, for example acetylenyl and propargyl.

The divalent bridging groups mentioned and any substituents present, as in the case of the alkylamino groups, derive, for example, from the above-mentioned monovalent alkyl, alkenyl or aryl radicals. Of course, the R radical may also have more than one functional group. Crosslinking reactions may be possible via the functional group.

Examples of appropriate silanes of the formula (II) which have a functional group on the non-hydrolyzable radical are γ-glycidyloxypropyltrimethoxysilane (GPTS), γ-glycidyloxypropyltriethoxysilane (GPTES), 3-isocyanatopropyltriethoxysilane, 3-isocyanatopropyldimethylchlorosilane, 3-aminopropyltrimethoxysilane (APTS), 3-aminopropyltriethoxysilane, N-(2-aminoethyl)-3-aminopropyltrimethoxysilane, N-[N'-(2'-aminoethyl)-2-aminoethyl]-3-aminopropyltrimethoxysilane, hydroxymethyltriethoxysilane, bis(hydroxyethyl)-3-aminopropyltriethoxysilane, N-hydroxyethyl-N-methylaminopropyltriethoxysilane, 3-(meth)acryloyloxypropyl-triethoxysilane and 3-(meth)acryloyloxypropyltrimethoxysilane. Further examples of hydrolyzable silanes usable in accordance with the invention can, for example, also be taken from EP-A-195493.

It is also possible to use silanes which have organic radicals which are substituted by fluorine. Such silanes are described in detail, for example, in WO 92/21729.

The use of hydrolyzable compounds with non-hydrolyzable groups allows additional function groups to be incorporated into the nanoparticles. The functions may, for example, be hydrophilic or hydrophobic groups, be functional groups which are suitable, for example, for crosslinking or attaching certain molecules, be ionic groups, etc.

Of course, it is also possible to use mixtures of the aforementioned hydrolyzable compounds, for example a compound with hydrolyzable lipophilic groups together with a hydrolyzable compound which has no non-hydrolyzable group and optionally no lipophilic hydrolyzable group, or which has one non-hydrolyzable group.

In a preferred embodiment, the amphiphilic particles are supplemented with function groups. These function groups are groups on the surface of the amphiphilic particles which impart an additional desired function to the particles. Such a functionalization allows the particles, if required, to be adapted to desired properties.

By means of this, the particles may receive an improved or, if appropriate, a worsened compatibility, for example with respect to other materials with which they are, for example, to be mixed. The function group makes it possible, for example, to introduce a hydrophobic, hydrophilic, oleophobic or oleophilic function. To achieve hydrophobic and/or oleophobic properties, it is possible, for example, to introduce function groups which comprise fluorinated hydrocarbon chains.

A further preferred function group is one in which one or more functional groups are introduced on the surface of the particles. By means of these, for example, reactions with other materials or between the particles are then also possible. Particular preference is given to functional groups which are suitable for cross-linking reactions, so that the particles thus modified, for example, are joined to a matrix-forming material with suitable functional groups by chemical reaction with the material, or crosslink it.

Such function groups may be obtained by reacting the amphiphilic particles with a surface modifier. The surface modification of nanoscale particles is a known process, as described by the applicant, for example, in WO 93/21127 (DE 4212633) or WO 96/31572. The preparation of the surface-modified particles can in principle be carried out in two different ways, specifically firstly by surface modification of already produced nanoscale particles and secondly by producing these particles using surface modifiers. The latter has already been explained comprehensively for the silanes of the formula (II) which can act as surface modifiers in situ in the formation of the particles.

The surface modification of finished amphiphilic particles can be effected in a simple manner by mixing the particles with the surface modifier. The reaction is optionally carried out in a solvent and, if necessary, by mechanical or thermal energy supply and/or by catalyst addition.

Suitable surface modifiers are compounds which firstly possess one or more groups which can react or interact with reactive groups (for example OH groups) present on the surface of the amphiphilic particles. The surface modifiers may, for example, form covalent, coordinate (complex formation) and ionic (salt-type) bonds to the surface of the nanoparticles, while the pure interactions include, by way of example, dipole-dipole interactions, hydrogen bonds and van de Waals interactions. Preference is given to the formation of covalent bonds, ionic bonds, or to complexation.

The surface modifiers generally have a relatively low molecular weight. For example, the molecular weight may be less than 1500, in particular below 1000 and preferably below 700 and more preferably below 500, but a higher molecular weight, for example up to 2000 and more, is possible.

For the surface modification of the nanoparticles, useful surface modifiers include inorganic and organic acids, bases, chelating agents, complexing agents such as β-diketones, proteins which may have complex-forming structures, amino acids or silanes. In a preferred embodiment, the surface modifier may be a complexing agent which forms the modification by complexation on the surface of the particles. Specific examples of surface modifiers are saturated or unsaturated mono- and polycarboxylic acids, the corresponding acid anhydrides, acid chlorides, esters and amides, amino acids, proteins, imines, nitriles, isonitriles, epoxy compounds, mono- and polyamines, β-dicarbonyl compounds such as β-diketones, oximes, alcohols, alkyl halides, metal compounds which possess a functional group which can react with the surface groups of the particles, for example silanes having hydrolyzable groups with at least one non-hydrolyzable group, for example hydrolyzable silanes of the above formula (II). Specific compounds for surface modifiers are mentioned, for example, in the abovementioned WO 93/21127 and WO 96/31572.

Particularly preferred surface modifiers are saturated or unsaturated carboxylic acids, β-dicarbonyl compounds, amines, phosphoric acids, sulfonic acids or silanes. As stated, the function group in a preferred embodiment has at least one functional group. For this purpose, surface modifiers are used which, in addition to a functional group for the attachment to the surface of the particles, comprise at least one further functional group.

Examples of a further functional group for the function group are hydroxyl, epoxy, thiol, amino, carboxyl, carboxylic anhydride, isocyanato, sulfonic acid groups, phosphonic acid groups, quaternary amine groups, C—C double bond groups such as acryloyl or methacryloyl, or carbonyl. In a wider sense, fluorinated hydrocarbon groups may also be included therein. Accordingly, bifunctional, trifunctional or higher-functionality surface modifiers are used for this purpose, preference being given to carboxylic acids, β-dicarbonyl compounds, amines, phosphonic acids, sulfonic acids or silanes having at least one additional group selected from the above-mentioned functional groups being preferred, such as unsaturated carboxylic acids, hydroxycarboxylic acids, amino acids, aminosulfonic acids, aminophosphonic acids, functionalized β-dicarbonyl compounds, epoxysilanes, (meth) acryloylsilanes or isocyanatosilanes.

Examples of preferred compounds which are used for surface modification are listed below:

Examples of carboxylic acids which preferably contain from 1 to 24 carbon atoms are saturated monocarboxylic acids (e.g. formic acid, acetic acid, propionic acid, butyric acid, pentanoic acid, hexanoic acid, capric acid, stearic acid, phenylacetic acid, benzoic acid), saturated polycarboxylic acids having 2 or more carboxyl groups (e.g. oxalic acid, malonic acid, adipic acid, succinic acid, glutaric acid and phthalic acid), unsaturated carboxylic acids (e.g. acrylic acid, methacrylic acid, crotonic acid, maleic acid, fumaric acid, and oleic acid) and hydroxycarboxylic acids (e.g. glycolic acid, lactic acid, malic acid and citric acid), and also derivatives of the carboxylic acids such as anhydrides, esters (preferably $C_1$-$C_4$-alkyl esters, for example methyl methacrylate) and amides.

Examples of β-dicarbonyl compounds which contain preferably from 4 to 12, more preferably from 5 to 8 carbon atoms are acetylacetone, 2,4-hexanedione, 3,5-heptanedione, acetoacetic acid and $C_1$-$C_4$-alkyl acetoacetate, and also functionalized dicarbonyl compounds such as 2-acetoacetoxy-ethyl methacrylate, hexafluoroacetylacetone and acetoacetamide.

Further examples are mono- and polyamines, especially those of the general formula $R_{3-n}NH_n$, where n=0, 1 or 2 and the R radicals are each independently alkyl groups having from 1 to 12, in particular from 1 to 8 and more preferably from 1 to 6 carbon atoms (e.g. methyl, ethyl, n- and iso-propyl, butyl or hexyl) and ethylenepolyamines (e.g. ethylenediamine, diethylenetriamine, etc.); sulfonic acids such as 2-aminoethanesulfonic acid and 3-aminobenzenesulfonic acid, phosphonic acids, amino acids; imines; and silanes, for example the hydrolyzable silanes having at least one non-hydrolyzable group of the above general formula (II), preference being given to those having a functional group on the non-hydrolyzable radical.

Examples of further suitable surface modifiers are quaternary ammonium salts of the formula $NR^1R^2R^3R^{4+}X^-$ where $R^1$ to $R^4$ are identical or different aliphatic, aromatic or cycloaliphatic groups having preferably from 1 to 12, in particular from 1 to 8 carbon atoms, for example alkyl groups having from 1 to 12, in particular from 1 to 8 and more preferably from 1 to 6 carbon atoms (e.g. methyl, ethyl, n- and iso-propyl, butyl or hexyl), and $X^-$ is an inorganic or organic anion, for example acetate, $OH^-$, $Cl^-$, $Br^-$ or $I^-$.

The carbon chains of these compounds may be interrupted by O, S or NH groups. Suitable surface modifiers are, for example, oxaalkanoic acids where 1, 2, 3 or more oxa groups may be present. Examples are trioxadecanoic acid, 3-oxabutanoic acid, 2,6-dioxaheptanoic acid and their homologs.

Preferred examples of surface modifiers which posses an additional group which may serve, for example, for crosslinking are functionalized β-dicarbonyl compounds such as 2-acetoacetoxyethyl methacrylate, hexafluoroacetylacetone and acetoacetamide, aminosulfonic acids such as 2-aminoethanesulfonic acid and 3-aminobenzenesulfonic acid, unsaturated carboxylic acids such as methacrylic acid and oleic acid, and hydroxycarboxylic acids such as lactic acid.

The amphiphilic nanoparticles may also be doped with at least one other metal or semimetal. In some cases, a nonmetal is also suitable. For the doping, any suitable metal compound or semimetal compound may be added in the preparation of the amphiphilic nanoparticles, for example an oxide, a salt or a complex, for example halides, nitrates, sulfates, carboxylates (e.g. acetates) or acetylacetonates. The other metal may occur in the compound in any suitable oxidation precursor. Examples of suitable metals for the doping are Mg, Ca, Y, Sc, Ce, W, Mo, Zn, Cu, Ag, Au, Sn, In, Fe, Co, Ni, Mn, Ru, Al, Sb, V, Nb, Ir, Rh, Os, Pd and Pt.

As a result of the doping, certain properties can be obtained. Appropriate dopants also depend upon the particular metal or semimetal which forms the main component. Particularly preferred metals for doping of $ZrO_2$ nanoparticles are, for example, Mg, Ca, Y, Sc and Ce. For the doping of $TiO_2$ nanoparticles, for example, very good results are achieved with W(VI), Mo(VI), Zn(II), Cu(II), Sn(IV), Sn(IV), In(II) and Fe(III). To prepare electrically conductive nanoparticles, doped metal oxides can be used, for example doped tin oxide such as ITO (indium tin oxide), ATO (antimony-doped tin oxide) and FTO (fluorine-doped tin oxide) or aluminum-doped zinc oxide. Specific examples of metal compounds for doping are $Y(NO_3)_3.4H_2O$, $Sc(NO_3)_3.6H_2O$, $WO_3$, $MoO_3$, $FeCl_3$, silver acetate, zinc chloride, copper(II) chloride, indium(III) oxide and tin(IV) acetate. The atomic ratio of doping element/metal or semimetal (main component) can be selected as required and is, for example, from 0.0005:1 to 0.2:1.

The nanoparticles produced in accordance with the invention may also be coated with another material to form particles with core-shell structure. Useful coating materials include inorganic, organically modified inorganic or organic polymeric materials. Inorganic or organically modified inorganic coatings or layers may be obtained, for example, from the aforementioned hydrolyzable compounds. Organic coatings may be formed from customary organic polymers used as binders in coating compositions or optionally modified naturally occurring polymers such as various sugars, for example starch, and derivatives thereof, proteins or celluloses or derivatives thereof.

For the production and dispersion of the nanoparticles, all customary solvents may be used. Suitable solvents are, for example, alcohols, ketones, hydrocarbons, but it is also possible to use oxygen-containing solvents such as tetrahydrofuran. Useful aqueous or water-containing solvents include water itself, acids and bases, but also mixtures of water-miscible solvents, for example alcohols or ketones.

In addition to the customary solvents, it is also possible for monomers which are mixed into a solvent to find use. It is even possible to employ pure organic monomers, for example methacrylic esters, as the solvent. When monomers are employed as the solvent, dispersion can also be followed by an addition polymerization process or a polycondensation process, in order, for example, to produce nanocomposites from the nanoparticles and the polymer matrix. It is also possible to use oligomers or already finished polymers, provided that they are soluble in the solvents used.

The matrix formers or binders used may be organic polymers known to those skilled in the art or the corresponding monomers or oligomers, for example poly-acrylic acid, polymethacrylic acid, polyacrylates, polymethacrylates, polyolefins, e.g. polybutadiene, polystyrene, polyamides, polyimides, polyvinyl compounds such as polyvinyl chloride, polyvinyl alcohol, polyvinyl butyral, polyvinyl acetate and corresponding copolymers, e.g. poly(ethylene-vinyl acetate), polyesters, e.g. polyethylene terephthalate or polydiallyl phthalate, polyarylates, polycarbonates, polyethers, e.g. polyoxymethylene, polyethylene oxide or polyphenylene oxide, polyether ketones, polysulfones, polyepoxides and fluoropolymers, e.g. polytetrafluoroethylene, or the corresponding monomers or oligomers. It is possible for functional groups through which crosslinking is possible to be present.

The inventive amphiphilic nanoparticles are typically obtained as a sol in the solvent and are obtained therefrom as powder by a customary separation process. Astonishingly, the amphiphilic nanoparticles, as a result of the production, are fully dispersible both in aqueous and in organic (prototropic and nonpolar) solvents.

Lipophilic hydrolyzable groups present on the surface of the amphiphilic nanoparticles ensure good compatibility and hence dispersibility in nonpolar solvents. For dispersion in aqueous media, the hydrolyzable shell can also easily be removed automatically under the influence of water to obtain water-dispersible systems. The hydrophilic groups present, for example hydroxyl, oxy or oxide groups, on the surface of the particles enable dispersibility in polar solvents. The invention has the advantage that it is not necessary as in the prior art to carry out complicated surface modification in order to obtain good redispersibility.

The amphiphilic nanoparticles according to the invention may be used as such or as a sol, or else in the form of a composition comprising the amphiphilic nano-particles. For the end use, the composition may comprise suitable additives. In particular, the composition may comprise one or more customary matrix formers. In a preferred embodiment, the amphiphilic particles have crosslinkable surface groups which can react with functional groups of the matrix former. The amphiphilic nanoparticles may of course possibly lose the hydrolyzable groups in the subsequent processing to form desired products, for example in the course of burnout to form ceramic products or as a result of hydrolysis proceeding in downstream processing stages.

Useful compositions which comprise amphiphilic nanoparticles according to the invention include, for example, a wide variety of different coating systems such as varnishes, adhesives, materials such as sealants and molding materials, composites, ceramic raw materials such as slips, pastes, suspensions, sols of all types, glass melts and glass-forming sols, solutions and dissolved monomers, polymers and polymer melts, which may also comprise other components, for example the matrix formers mentioned, plasticizers, thermal and radiation-induced polymerization and polycondensation catalysts, and known further additives, including other nanoparticles. Equally useful as matrix formers are metals or combinations of polymeric, glass-like, metallic or ceramic matrix precursors as hybrid materials.

Useful matrix formers are therefore all materials which are suitable as precursors for productions of matrix bodies from plastic or organic polymers, metal, glass, ceramic, glass-ceramic, building materials, composites or hybrid materials thereof. Of course, the amphiphilic nanoparticles can also function as matrix formers and be used alone, for example to produce a ceramic. Such precursors are, for example, the organic monomers, oligomers or polymers already described above for use as solvents, from which a purely organic polymer matrix can be formed.

It is also possible to use matrix-forming precursors to form inorganic or organically modified inorganic matrices. For this purpose, it is likewise possible to form, from hydrolyzable compounds or monomers, preferably by the above-described sol-gel process via a hydrolysis and condensation, polycondensates which, in the finished product, can form an inorganic or organically modified inorganic matrix. When the amphiphilic nanoparticles according to the invention are mixed with such polycondensates or precursors thereof, corresponding nanocomposites can be prepared from nanoparticles in the corresponding sol-gel matrix.

This sol-gel matrix may be purely inorganic, i.e. give rise to glasses or ceramic materials in the course of heating, but it may also be a so-called hybrid matrix (organically modified inorganic matrix), when, for example, alkoxides or organofunctional silanes are used. In addition, such sol-gel matrices may also additionally be provided with organic monomers, oligomers or polymers, for example those described above, which may likewise enter into addition polymerization and polycondensation processes and/or may serve as flexibilizers. Especially advantageous are polyvinyl alcohol, polyvinylpyrrolidone, polyacryl-amide, polyvinylpyridine, polyallylamine, polyacrylic acid, polyvinyl acetate, polymethylmethacrylic acid, starch, gum arabic, other polymeric alcohols, for example polyethylene-polyvinyl alcohol copolymers, polyethylene glycol, polypropylene glycol and poly(4-vinylphenol), or monomers or oligomers derived therefrom.

To produce the polycondensates or the precursors thereof, the hydrolyzable compounds listed above may be used, especially the hydrolyzable compounds of the formulae (I) and (II). Preference is given here to using glass- or ceramic-forming semimetals or metals M, especially elements from main groups II to V and/or transition groups II to V of the Periodic Table of the Elements, and Mg. The elements are preferably Si, Al, B, Sn, T, Zr, Mg, V or Zn, in particular Si, Al, Ti, Zr and Mg, or mixtures of two or more of these elements. It will be appreciated that it is also possible to incorporate other glass- or ceramic-forming elements, in particular those of elements of main groups I and II of the Periodic Table (e.g. Na, K and Ca) and of transition groups VI to VIII of the Periodic Table (e.g. Mn, Cr, Fe and Ni). It is also possible to use lanthanoids.

When hydrolyzable compounds with nonhydrolyzable organic radicals are used, for example the silanes of the formula (II), organically modified inorganic polycondensates are obtained, for example polyorganosiloxanes which can be converted to organically modified matrices.

Appropriate reaction control, for example by a partial hydrolysis in the course of introduction into inorganic monomers (hydrolyzable compounds) allows interactions of nanoparticle to nanoparticle to be obtained after the polymerization process, and these interactions can be employed to control the viscosity of the fully or partly polymerized monomer.

The amphiphilic nanoparticles according to the invention may be used in the form of a powder, of a sol or of a composition as explained above, for example, to produce compact materials and components. It is also possible to produce coatings via viscous intermediates. Such coatings may be structured by means of photolithographic processes, laser structuring, twin-shaft mixer processes or holographic techniques. It is therefore possible to form a two-dimensional structure, for example layers or films, or a shaped body, especially a ceramic two-dimensional structure or a ceramic shaped body.

The amphiphilic nanoparticles according to the invention, especially corresponding $ZrO_2$ nanoparticles, are suitable for use in coating substances, adhesives, resins and sealants which can be used for various substrates. Substrates used for this purpose are generally composed of metal, plastic, optionally modified natural substances, ceramic, concrete, clay and/or glass, or mixtures thereof. After appropriate curing, for example thermally, catalytically, by irradiation or a combination thereof, very advantageous properties of the layers can be achieved, especially with regard to transparency, flexibility, mechanical strength, attrition resistance, corrosion resistance, improved tribological behavior, adjusted refractive index (highly refractive), improved demolding and reduced adhesion. Such advantageous properties may also be achieved in the self-supporting shaped bodies explained above, such as components or films, composed of the amphiphilic nanoparticles.

There follow use examples for objects which include units and components which comprise a polymer matrix, metal matrix, ceramic matrix or glass matrix, and in whose preparation the inventive amphiphilic nanoparticles can be used, or which possess coatings, layers, adhesive bonds or paint systems in whose production the inventive amphiphilic nanoparticles can be used:

Objects which include units and components in whose production the inventive amphiphilic nanoparticles are used are suitable for the production of equipment and parts thereof, devices and machines for commercial or industrial purposes and research and parts thereof, for means of locomotion and transport and parts thereof, household objects and equipment for the household and parts thereof, equipment, items and aids for games, sport and leisure and parts thereof, items, aids and devices for medical purposes and parts thereof, implants and prostheses for medical purposes, and also building materials and parts of buildings.

Specific examples of such objects which include units and components are specified below:

Equipment, devices and machines for commercial or industrial purposes and research and parts thereof: molds (compression molds, thermoforming molds, casting molds, die-cutting molds), powder funnels, gearwheels, filling plants, extruders, waterwheels, rollers, injection moldings, casings, tubes, keyboards, switches, tools, conveyor belts, printing machines, screenprinting templates, transfer machines, agitated belts, sieves, drill heads, drills, turbines, pumps, saw blades, covers, door handles, displays, lenses, tool handles, liquid vessels, insulators, computer casings, casings for electronic appliances, machine casings, machine parts, for example shafts, ball bearings, bolts, screws, rivets, films, membranes, fingerprint sensors, cutting tools, plasma cutting dies, punching tools, hammer mills, mill accessories, offgas coolers, high-temperature heat exchangers, metal machining, metal-ceramic binders, high-temperature ventilators, turbine blades, reactor materials, solar coating (Zr/$ZrO_2$), catalysts, anode material for SOFC, protective tube for thermoelements, lens holders, gas turbines and parts thereof, rocket parts, reinforcement, opaque glasses for windows, shower dividers, dividing walls, lamps, lighting means, seals and assembly bonds for lighting means, electric and electronic components, optical components.

Means of locomotion and transport (for example automobiles, trucks, omnibuses, motorbikes, mopeds, pushbikes, railroads, trams, ships and aircraft) and parts thereof: external coatings of vehicles, corrosion protection coatings, clearcoats, chassis, headlights, rear lights, internal and external mirrors and their casings, windshields, windshield wipers, rear wipers, side wipers, protective panel for pushbikes and motorbikes, brakes of pushbikes and motorbikes, motorbike helmets, visors, instruments of motorbikes, seat parts, saddle parts, door handles, steering wheels, chromium parts, wheel rims, tank nozzles, tank, container (coolant, windscreen water), seals, hoses, license plates, luggage carriers, roof carriers, roof containers for automobiles, seat covers, leather applications, cockpits and internal and external linings, tires and fenders, ships' hulls, masts, sails, loading doors, wings, empennage, aircraft windows, scratch-resistant plastic sheets, highly mechanically stressed aircraft parts, jets for rocket engines, reinforcements.

Household objects and equipment for the household and parts thereof: furniture, trashcans, dishware, trays, porcelain, lampshades, furniture mounts, cutlery, cooking utensils (spoons, graters, etc.), casings for entertainment electronics and kitchen appliances, mattresses, sinks, parquet, floor coverings made of plastics, laminate, panels, worktop, handles for pans and pots, pans and pots, furniture veneer, vacuum cleaners, mixers, bread cutting machines, irons, fingerprint sensors.

Equipment, items and aids for games, sport and leisure and parts thereof: garden furniture, garden equipment, tools, playground equipment, tennis rackets, table tennis bats, table tennis tables, skis, snowboards, surfboards, golf clubs, seating facilities in parks, ski boots, diving clothing, diving goggles.

Items, aids and devices for medical purposes and invalids: prostheses, implants, catheters, tooth prostheses, tooth implants, tooth braces, tooth replacement, inlays, tooth fillings, tooth fillers, bridges, screws, medical implements, wheelchairs, and casings and components of medical equipment, instrument holders for medical equipment and doors and covers for medical equipment.

Building materials and parts of buildings: floors and staircases made of natural stone (concrete, etc.), floor coverings made of plastic, floor strips, window frames, windowsills, doors, door handles, fittings in kitchen, bathroom and restroom, pipes, cable ducts, banisters, supporting components, gutters, water butts, oil tanks, chimney pipes, plastic roofs, panorama roofs, toilets, baths, shower cabins, winter gardens, mirrors, light switches, wall and floor tiles, glazings made of plastic, handrails of banisters and escalators, sculptures and generally works of art made of natural material, interior and exterior metals, steel supports, supports, free-standing metal constructions.

Other use examples are yarn, cables, food packagings, generally all objects which are produced from rubber and plastics, masts, textiles, bottles, CDs, CD covers, watches, watch glasses, leather items, films, pictures, photos, adhesive tapes, driving licenses, identification papers, check cards, registration cards, chip cards, writing equipment, nail files, urns, jewelry, coins, works of art, book covers, gravestones, signs (e.g. traffic signs), textiles, protective goggles, seals for installation, adhesives, adhesive tapes for sealing, adhesive tapes for corrosion prevention, pane sealing tape, tear-resistant adhesive tapes, adhesive tape primers, attrition-resistant adhesive tapes, chemical-resistant adhesive tapes, transparent adhesive tapes, re-detachable adhesive tapes, film adhesive tapes, adhesive tapes with high tear strength, adhesive tapes with high chemical resistance, adhesive tapes for bonds of low- and high-energy surfaces, acrylic foam adhesive tapes, heat-activatable adhesive tapes in adhesion promoters, double-sided adhesive tapes, transparent aging-resistant adhesive tapes, anti-scratch adhesive tapes, anti-slide adhesive tapes, scratch-resistant adhesive tapes, packaging adhesive tapes, transport adhesive tapes, tear-resistant adhesive tapes, adhesive tapes for preventing galvanic corrosion, heat-resistant masking tapes, durable masking tapes, solvent-resistant masking tapes, pane masking tapes, transfer adhesive tapes, transparent masking tapes, paper adhesive tapes, spray adhesives, re-detachable spray adhesives, permanent spray adhesives, transfer adhesives, thermally conductive adhesives, thermally conductive adhesive films, thermally conductive epoxy adhesives, isotropically and anisotropically conductive adhesive films, screenprinting adhesives, UV-drying screenprinting adhesives, construction adhesives for adhesive bonding of low-energy plastics, dispersion adhesives for the adhesive bonding of high-energy plastics, coated metal sheets, leather and textiles, melt adhesives, multipurpose adhesives, adhesives for adhesive bonding of different metals, adhesives for adhering metals and plastics, adhesives for adhering metals and glass, pane assembly adhesives, fabric tapes, for example for closing, sealing, bundling, indicating and reinforcing, water-repellent fabric tapes, aging-resistant fabric tapes, durable fabric tapes, crepe adhesive tapes, sealing tape, chemical-binding webs, industry-binding webs, oil-binding webs, absorption materials with excellent absorption and weight ratios, safety coverings on floors, self-adhesive anti-slip coverings, safety coverings on vehicles, polishing media, polishing pads, polishing foams, polishing disks, polishing pastes, polishing cloths, abrasives, abrasive paper, structured abrasives, surface protection films, high-temperature-resistant cover films, anti-shatter films, display window foils, display window films, reflecting films for traffic signs, retro-reflecting films, design films, flexible films, signal films, color films, coating protection films, copier films, universal films, presentation covers, lamination films, corrosion protection films, acoustic insulation films for building site products, anti-stone chip films, chemical-resistant masking films and cover films, sun protection films, heat protection films, self-adhesive seals, easily removable signs, sign cover films, high-performance films for extreme temperatures, high-performance films with extreme chemical resistance, high-performance films with extreme attrition resistance, printable films (for example for laser printers, inkjet printers), multi-layer films, laser and gravure films, recycling-compatible films, safety labels, indication labels, other labels, self-adhesive elastic buffers.

Ceramic parts are used as components in machines, appliances, modes of transport, electric, electronic and information-processing components, and appliances and consumer goods. Tools, prostheses, tooth replacement parts (bridges, inlays, crowns, tooth implants), sensors, etc. are likewise produced from the amphiphilic nanoparticles.

Further examples of parts or composites are gearwheels, ball bearings and roller bearings, dies, drawing dies, wire guides, bearing shells, extrudate press dies, spinning dies, thread guides, valves, cylinders, cylinder heads, pump parts, spouts, catalyst supports, refractory linings, crucibles, fibers, blades for knives, scissors or cutting and shredding tools, microcomponents (for example gearwheels, reactor vessels), heat conductors, electrolytes, oxygen conductors (as sensors in lambda probes and metal melts), oscillators, piezoelectrics, high-frequency induction loops. Examples of porous parts are filters, catalyst supports and absorber materials. Further examples are cutting tools, abrasives, transformation-reinforced ceramics, heat insulation layers, electrical insulation materials, tribological layers, slide bearings, oxygen sensors (lambda probe), oxygen ion conductors (electrode material), piezoelectrics, heat- and oxidation-resistant oven parts, burner parts, exhaust gas pipes, brake disks, pushbike tires, wheel bearings, injection pumps, lambda probes, cylinder linings, fuel cells, spark plug insulators, exhaust gas manifolds, turbocharger blades, valve springs, dishware, knives, scissors, cutting tools, baking oven lining, baking oven filter material, hotplates, household grinders, meat grinders, presses, cooking utensils (spoons, graters), handles for pans and pots, door handles, ceramic seals for water faucets and valves, tiles, nail files, pots, vases, mortars, candle holders, washing machine drum bearings, fuel cells, oil burners and gas burners and their linings, wheel bearings for sport equipment, slide bearings for angling, leisure knives, tools, high-pressure cleaners, metering pumps.

The use of amphiphilic nanoparticles according to the invention in two-dimensional structures, especially sheets, films and membranes, opens up a series of advantages. Examples of suitable objects are explained below together with the advantages which arise.

There is protection against wear and corrosion. This is, for example, advantageous in the sector of the chemical industry for vessel and pipe walls of reaction vessels, stirrers, pumps (casings, blades/rotors, valves), valves and sensors (thermoelements, fill level sensors, pressure sensors, proximity switches, distance sensors, measurement cells of mass flow controllers); in the automobile sector and in the field of stationary gasoline and diesel engines, in particular for moving parts such as pistons, piston rings, cylinders, valves, shafts, bearing carriers, bearing surfaces, but also flywheels, brake disks and clutch plates, in the sector of metal processing for producing tools for metal machining (turning, milling, drilling, sawing) and for producing die-cutting dies and compression molds.

Corrosion-resistant insulator layers are obtained (electrical insulation). This is, for example, advantageous on metallic substrates/surfaces (current conductors) in the field of furnace and heating technology and of oven construction, especially in the field of the ceramics industry/process technology, of mining, heavy industry and the chemicals industry, in the field of sensors as a corrosion-resistant electrical insulation of sensors, conductor paths, casings and for SOFCs (production of thin gas-tight layers (thickness <2 μm) on ceramic substrates with controlled adjustment of thickness, structure and oxygen ion conductivity).

The inventive use allows the production of low-sintering porous layers. The high specific surface area of the porous layers enables improved catalytic and sensitive properties. Applications include oxygen sensing in hot gases (exhaust gases) in the automobile sector, and also for stationary gasoline or diesel engines, in the field of power and heat supply, in the mining and heavy industry sector and the chemical industry.

In the field of catalysis serves, the amphiphilic nanoparticles can be used to produced a porous substrate (catalyst support). Fields of use are the cleaning of gases and gas/particle mixtures, for example in the field of engine exhaust gases in the automobile sector, industrial offgases (flue gases, prevention of odor nuisance and impairment of health), in the field of the chemical industry in the catalytic synthesis of gaseous or liquid products in reactor vessels and tubular reactors.

Further fields of use of these materials are heat insulation layers in all fields of hot gas application, such as in stationary and mobile gas turbines (blades, gas feeds), linings of exhaust gas pipes in the automobile sector and stationary gasoline and diesel engines, and the use of porous layers as adsorber materials.

Further possible uses are the production of corrosion-resistant, self-supporting, low-sintering, thin-wall ceramic components in single-layer and multi-layer versions (laminates), for example as platings/linings: corrosion protection for the chemical industry for vessel and pipe walls of reaction vessels, stirrers, for casings of pumps, valves, sensors, as substrates for the electronics industry, for example microelectronics, large-scale integrated circuits in the field of computer and cellphone technology, and mobile measurement/regulation units.

It is possible to produce inorganic, high-temperature-resistant, corrosion-stable membranes, for example multi-layer structures with thin separating membrane (thickness <2 μm); it is possible for the actual separating membrane, like the porous supporting matrix, to comprise nanodisperse $ZrO_2$; hot gas extraction, $H_2$ production (reforming), high-temperature- and corrosion-stable UF or NF membranes (chemical industry: concentration of products, removal of impurities, environment: wastewater treatment; medicine: sterilizable ceramic filters with pore diameters in the range of 0.1-10 nm).

It is possible to produce functional coatings with nanodispersed particles as the inorganic binder phase, for example for binding inorganic materials to substrates made of metal, ceramic, glass to produce functional coatings, as high-temperature-resistant tribological layers, high-temperature-stable mold release layers, high-temperature easy-to-clean layers, to prevent corrosion damage on molds as a result of aggressive liquid media such as metal or polymer melts, to prevent deposits in the commercial and private sector, especially in the field of furnace technology (heating flues, ovens, heating tanks, pipes, valves, sensors), the chemical industry (stirred and reaction tanks, pipe walls, stirrers, valves, pumps, tanks), the metal-processing industry (hand ladles, casting dies, soldering dies, riser tubes), pumps (pistons, rotors, cylinders, casing, inlets and outlets) and in the foods industry (ovens, baking sheets or molds, stirred vessels), stock vessels (silo walls, discharge screw, star feeders, pipelines), extruders (screws, pistons, cylinders, dies), transport devices, especially belts.

A further example is that of joining films and substrates for producing sandwich structures composed of ceramic, glass and ceramic, and also metal and ceramic.

There follow examples to illustrate the invention.

EXAMPLE 1

Production of Amphiphilic $ZrO_2$ Nanoparticles (iso-PrOH Dispersant)

7.6 g (70% in n-PrOH) of $Zr(OPr)_4$ were combined with 136 g of n-hexanol and, after stirring at room temperature for 5 min, 0.90 g of 37% HCl in 6 g of n-hexanol was added. The entire mixture was then treated at 250° C. and 300 bar for 7 h.

The amphiphilic $ZrO_2$ nanoparticles formed, having hexoxy groups on the surface, were centrifuged off and taken up in 5 ml of i-PrOH. Subsequently, they were dried at 50° C. and 10 mbar. High-resolution transmission electron micrographs show that the particles are crystalline and the particle sizes are from 3 to 5 nm.

EXAMPLE 2

Incorporation of the $ZrO_2$ Particles into NANO Matrix (Water Dispersant)

0.2 g of the $ZrO_2$ powder produced according to Example 1 was admixed with 0.5 g of distilled water and then treated with ultrasound for from 2 to 3 min and subsequently admixed with 0.5 g of IPE (isopropoxyethanol). Thereafter, 2 g of NANO coating (coating described in DE-A-4338361, which comprises boehmite and a condensation product composed of an epoxysilane, a tetraalkoxysilane and aluminum butoxide) were added dropwise to the clear dispersion, and the mixture was diluted with 2 g of IPE. PC plaques were coated with the coating composition thus produced using a spin-coater (1000 rpm, 10 s) and dried at 130° C. for 1 h. The refractive index was 1.535.

0.5 g of the $ZrO_2$ powder produced according to Example 1 was admixed with 1.0 g of distilled water and then treated with ultrasound for from 2 to 3 min and subsequently admixed with 1.0 g of IPE. Thereafter, 2 g of NANO coating were added dropwise to the clear dispersion which was subsequently diluted with 4 g of IPE. PC plaques were coated with the coating composition thus produced using a spin-coater (1000 rpm, 10 s) and dried at 130° C. for 1 h. The refractive index was 1.581.

0.73 g of the $ZrO_2$ powder produced according to Example 1 was admixed with 1.5 g of distilled water and then treated with ultrasound for from 2 to 3 min and subsequently admixed with 1.5 g of IPE. Thereafter, 2 g of NANO coating were added dropwise to the clear dispersion which was subsequently diluted with 5 g of IPE. PC plaques were coated with the coating composition thus produced using a spin-coater (1000 rpm, 10 s) and dried at 130° C. for 1 h. The refractive index was 1.605.

EXAMPLE 3

Production of Amphiphilic $ZrO_2$ Nanoparticles (Hexane Dispersant)

Example 1 was repeated, except that the amphiphilic $ZrO_2$ nanoparticles formed, having hexoxy groups on the surface, after being centrifuged off, were taken up in 5 ml of n-hexane instead of in methanol. Subsequently, they were dried at 50° C. and 10 mbar. Transmission electron micrographs show that the particles are crystalline and the particle sizes are from 4 to 5 nm.

EXAMPLE 4

Incorporation of the $ZrO_2$ Particles into NANO Matrix (Toluene Dispersant)

0.2 g of the $ZrO_2$ powder produced according to Example 3 was admixed with 0.5 g of toluene and then treated with ultrasound for from 2 to 3 min. Thereafter, 2 g of NANO coating were added dropwise to the clear dispersion and the mixture was diluted with 2 g of IPE. PC plaques were coated with the coating composition thus produced using a spin-coater (1000 rpm, 10 s) and dried at 130° C. for 1 h. The refractive index was 1.535.

0.5 g of the $ZrO_2$ powder produced according to Example 3 was admixed with 1.0 g of toluene and then treated with ultrasound for from 2 to 3 min. Thereafter, 2 g of NANO coating were added dropwise to the clear dispersion and the mixture was diluted with 4 g of IPE. PC plaques were coated with the coating composition thus produced using a spin-coater (1000 rpm, 10 s) and dried at 130° C. for 1 h. The refractive index was 1.581.

0.73 g of the $ZrO_2$ powder produced according to Example 3 was admixed with 1.5 g of toluene and then treated with ultrasound for from 2 to 3 min. Thereafter, 2 g of NANO coating were added dropwise to the clear dispersion and the mixture was diluted with 5 g of IPE. PC plaques were coated with the coating composition thus produced using a spin-coater (1000 rpm, 10 s) and dried at 130° C. for 1 h. The refractive index was 1.605.

What is claimed is:

1. A process for the production of an amphiphilic nanoscale particle that comprises a hydrolyzable lipophilic moiety on a surface thereof, which process comprises (a) subjecting at least one hydrolyzable compound which comprises at least one hydrolyzable lipophilic group to a hydrolysis and condensation reaction with a substoichiometric amount of water to obtain a plurality of amphiphilic nanoscale particles and (b) removing liquid to obtain the plurality of amphiphilic nanoscale particles in a form of a powder.

2. The process of claim 1, wherein the at least one hydrolyzable compound comprises at least one of (i) a hydrolyzable metal or semimetal compound which comprises at least one hydrolyzable lipophilic group and may comprise one or more non-hydrolyzable groups and (ii) a condensation product derived from the at least one hydrolyzable compound.

3. The process of claim 2, wherein the at least one hydrolyzable compound comprises an alkoxide.

4. The process of claim 3, wherein the at least one hydrolyzable compound comprises at least one of (i) a compound of at least one of Mg, Si, Ge, Al, B, Zn, Cd, Ti, Zr, Ce, Sn, In, La, Fe, Cu, Ta, Nb, V, Mo or W and (ii) a condensation product derived therefrom.

5. The process of claim 1, wherein at least one hydrolyzable lipophilic moiety comprises at least four carbon atoms.

6. The process of claim 1, wherein the at least one hydrolyzable moiety comprises at least one of an alkoxy, alkenyloxy, alkynyloxy, aryloxy, aralkyloxy, alkaryloxy, ether, acyloxy, alkyl or acyl group.

7. The process of claim 6, wherein at least one hydrolyzable moiety is fluorinated.

8. The process of claim 1, wherein the at least one hydrolyzable moiety comprises a $C_4$-$C_{20}$-alkoxy group.

9. The process of claim 8, wherein the at least one hydrolyzable moiety comprises at least one of a pentoxy group and a hexoxy group.

10. The process of claim 1, wherein the at least one hydrolyzable moiety is derived from a hydrolyzable precursor of the particle.

11. The process of claim 1, wherein the particle comprises one or more optionally hydrated oxides of one or more metals or semimetals.

12. The process of claim 1, wherein a mean diameter of the plurality of particles is not higher than 200 nm.

13. The process of claim 1, wherein a mean diameter of the plurality of particles is not higher than 100 nm.

14. The process of claim 1, wherein a mean diameter of the plurality of particles is from 2 nm to 50 nm.

15. The process of claim 1, wherein a molar ratio of water to hydrolyzable lipophilic groups is not higher than 0.8:1.

16. The process of claim 15, wherein the molar ratio is not higher than 0.6:1.

17. The process of claim 15, wherein the molar ratio is not higher than 0.5:1.

18. The process of claim 15, wherein the molar ratio is from 0.25:1 to 0.5:1.

19. The process of claim 15, wherein the molar ratio is about 0.45:1.

20. The process of claim 1, wherein the hydrolysis and condensation reaction is carried out at a temperature of at least 40° C.

21. The process of claim 20, wherein the reaction is carried out at a temperature of at least 100° C.

22. The process of claim 20, wherein the reaction is carried out at a temperature of at least 200° C.

23. The process of claim 1, wherein the hydrolysis and condensation reaction is carried out with heating and under pressure.

24. The process of claim 1, wherein the process further comprises reacting the amphiphilic nanoscale particle with a surface modifier to provide the particle with one or more functional groups on a surface thereof.

25. The process of claim 24, wherein the reaction with the surface modifier is carried out in a solvent.

26. The process of claim 24, wherein the surface modifier comprises at least one of a saturated or unsaturated carboxylic acid, α,β-dicarbonyl compound, an amine, a phosphonic acid, a sulfonic acid and a silane.

27. The process of claim 24, wherein in addition to at least one functional group for attachment or complexation to the surface of the particle, the surface modifier comprises at least one further functional group.

28. The process of claim 24, wherein the surface modifier comprises a complexing agent.

29. A process for the production of an amphiphilic nanoscale particle that comprises a hydrolyzable lipophilic moiety on a surface thereof, which process comprises (a) subjecting at least one hydrolyzable compound which comprises at least one hydrolyzable lipophilic group to a hydrolysis and condensation reaction with an amount of water which results in a molar ratio of water to hydrolyzable lipophilic groups of not higher than 0.8:1 to obtain a plurality of amphiphilic nanoscale particles having a mean diameter of not higher than 200 nm and (b) removing liquid to obtain the plurality of amphiphilic nanoscale particles in a form of a powder.

30. The process of claim 29, wherein at least one hydrolyzable lipophilic moiety comprises at least four carbon atoms.

31. The process of claim 30, wherein the hydrolysis and condensation reaction is carried out at a temperature of at least 100° C.

* * * * *